US009483784B2

(12) United States Patent
Raney (10) Patent No.: US 9,483,784 B2
(45) Date of Patent: Nov. 1, 2016

(54) SECURE ONLINE MARKETPLACE (71) Applicant: DoubleChecked Credentials LLC, Austin, TX (US)

(72) Inventor: Kristopher Raney, Austin, TX (US)

(73) Assignee: DoubleChecked Credentials LLC, Austin, TX (US)

(*) Notice: Subject to any disclaimer, the term of this patent is extended or adjusted under 35 U.S.C. 154(b) by 676 days.

(21) Appl. No.: 13/920,650

(22) Filed: Jun. 18, 2013

(65) Prior Publication Data

US 2014/0372252 A1     Dec. 18, 2014

(51) Int. Cl.
*G06Q 30/06*     (2012.01)

(52) U.S. Cl.
CPC ...... *G06Q 30/0609* (2013.01); *G06Q 30/0613* (2013.01); *G06Q 30/0615* (2013.01)

(58) Field of Classification Search
CPC .................................................. G06Q 30/0609
USPC ...................................................... 705/26.35
See application file for complete search history.

(56) References Cited

U.S. PATENT DOCUMENTS

| 4,799,156 | A | * | 1/1989 | Shavit | G06Q 10/087 705/26.3 |
| 5,715,314 | A | | 2/1998 | Payne et al. | |
| 5,724,424 | A | | 3/1998 | Gifford | |
| 6,701,303 | B1 | | 3/2004 | Dunn et al. | |
| 6,816,843 | B1 | | 11/2004 | Baughman | |
| 7,797,271 | B1 | * | 9/2010 | Bonneau | G06F 17/30873 705/26.8 |
| 8,275,636 | B2 | * | 9/2012 | Berg | G06Q 40/08 705/38 |
| 2002/0046147 | A1 | * | 4/2002 | Livesay | G06Q 10/06 705/37 |
| 2002/0188481 | A1 | * | 12/2002 | Berg | G06Q 40/08 705/4 |
| 2004/0250083 | A1 | * | 12/2004 | Schwab | G06Q 30/0601 713/182 |
| 2008/0319872 | A1 | * | 12/2008 | Russell | G06Q 20/00 705/26.35 |
| 2009/0164335 | A1 | * | 6/2009 | Joseph, Jr. | G06Q 30/06 705/26.1 |
| 2010/0153278 | A1 | * | 6/2010 | Farsedakis | G06Q 10/0637 705/80 |
| 2010/0179884 | A1 | * | 7/2010 | Glaser | G06Q 30/08 705/26.1 |

FOREIGN PATENT DOCUMENTS

WO    WO-2005/067402  A2 *  7/2005

OTHER PUBLICATIONS

Anon., "Property and Casualty Insurance Companies; Patent Issued for Identity Insurance Transaction Method," Insurance Weekly News, Oct. 12, 2012.*

* cited by examiner

*Primary Examiner* — Nicholas D Rosen
(74) *Attorney, Agent, or Firm* — Washam PLLC; Steven H. Washam (57) ABSTRACT

A networked service for providing secure access to an online marketplace by sellers and buyers. A secure member server interacts with an online classified advertisement website to allow for a selling member of the website to interface securely with a prospective buying member. Various methods are taught that allow the members to interact without exchanging personal information that could possibly be used in a fraudulent manner.

24 Claims, 9 Drawing Sheets

SECURE ONLINE MARKETPLACE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to online ecommerce systems and, more particularly, to systems and methods for securely facilitating the advertisement and sale of goods or services in a online environment to familiar and unfamiliar parties.

2. Description of Related Art Including Information Disclosed Under 37 CFR 1.97 and 1.98

Websites featuring online classified advertisements are commonly used to exchange a wide variety of goods and services, with most online advertisements typically made available and visible to individuals throughout the world. While this enables a greater number of potentially interested parties to transact business, the anonymous nature of the Internet also exposes advertisers' contact and other information to individuals with fraudulent or even criminal intent. Likewise, individuals may also be exposed to fraudulent advertisements, exposing the would-be buyers to similar risk of criminal intent.

Even popular ecommerce websites, though perceived as reputable, provide relatively few safeguards in an attempt to prevent fraudulent and criminal activity. For example, Amazon.com, eBay, and Craigslist each require an account to access the services provided. However, little is done to verify the account holder and the information provided by the account holder other than to ensure that the email address is valid. Amazon.com and eBay also provide secure server connections, but this merely encrypts data transmissions between parties and does nothing to verify that either party is legitimate with regard to the contemplated transaction. In fact, most such websites provide only limited FAQs intended to merely educate users as to how to prevent and to recognize fraudulent activity leaving it entirely up to the individual user to manage his or her own accounts and affairs.

Unfortunately, each added level of security in a transaction increases the burden on the parties involved in the transaction, which can easily lead to such onerous requirements that the parties chose not to transact business at all. The present invention addresses these shortcomings by providing systems and methods that allow a seller to readily verify the validity of a potential purchaser, and that allow a purchaser to readily verify the validity of a seller prior to consummating a transaction and without disclosing excess information concerning either party.

BRIEF SUMMARY OF THE INVENTION

The present invention teaches a method for providing secure access by selling member users and buying member users to an online marketplace, the method steps comprising: accepting, on a secure member server, a request for membership to an online marketplace from an unauthenticated buying member user, the membership request including a plurality of buying member user personal identity data; and restricting the unauthenticated buying member user's access to a selling member user's personal identity data with regard to an advertised offering placed by the selling member on the online marketplace, the restriction conditioned upon the outcome of at least one test for authentication of the buying member user. Other embodiments incorporating additional imitations are described and claimed herein.

Also taught herein is a system for providing secure access by selling member users and buying member users to an online marketplace, the system comprising: providing an online secure membership server in network communication with an online marketplace, the secure membership server adapted to accept a request for membership to an online marketplace from an unauthenticated buying member user, the membership request including a plurality of buying member user personal identity data, and to restrict the unauthenticated buying member user's access to a selling member user's personal identity data with regard to an advertised offering placed by the selling member on the online marketplace, the restriction conditioned upon the outcome of at least one test for authentication of the buying member user. Additional limitations forming other system embodiments are also described and claimed herein.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, wherein.

The above figures are provided for the purpose of illustration and description only, and are not intended to define the limits of the disclosed invention. Use of the same reference number in multiple figures is intended to designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

As used herein, the term "automated computing device" or "computing device" means a device capable of executing program instructions as streamed or as requested from attached volatile or non-volatile memory. For example, such a device utilizes a microprocessor, microcontroller, or digital signal processor in signal communication with a memory component (RAM, ROM, etc.), one or more network components (NIC, Wi-Fi, Bluetooth, Zigbee, etc.), one or more user input components (keyboard, mouse, touchscreen, etc.), one or more user output or display components, and/or additional peripheral components including a database for bulk data storage. The computing device may also utilize a standard operating system upon which the program instructions may be executed (OS X, iOS, Linux, UNIX, Android, Windows, etc.) or may utilize a proprietary operating system for providing basic input/output. Examples include, but are not limited to, a mainframe computer, workstation computer, database server, personal computer, laptop computer, notebook computer, tablet computer, smartphone, PDA, or the like, or some combination thereof.

As used herein, the term "computer network" means any telecommunications network that allows computing devices to exchange data over wired and/or wireless connections. Such a network also allows for distributed processing, for example, through website and database hosting over multiple computer network connected computing devices. The present invention may utilize one or more such networked computing devices, with each device physically residing in different remote locations, including in the "cloud" (i.e., cloud computing). As used herein, the term "online" means, with respect to a computing device, that the computing device is in computer network communication with one or more additional computing devices. The term "online" means, with respect to a user of a computing device, that the user is utilizing the computing device to access one or more additional computing devices over a computer network.

As used herein, the term "computer network address" or "network address" means the uniform resource identifier (URI) or unique network address by which a networked computer may be accessed by another. The URI may be a uniform resource locator (URL), a uniform resource name (URN), or both, as those terms are understood by one of ordinary skill in the information technology industry.

As used herein, the term "web browser" means any software application for retrieving, presenting, or traversing information over a computer network (e.g., Safari, Firefox, Netscape, Internet Explorer, Chrome, and the like). A web browser accepts as an input a network address, and provides a page display of the information available at that network address.

The present invention is useful with any online ecommerce service accessible using a web browser, especially those designed to allow members to create classified advertisements in an online marketplace for the sale of goods and services to others. Examples include, but are not limited to, Amazon.com, eBay, Craigslist, PennySaverUSA, and the like. Such online marketplaces typically operate on high-bandwidth server hardware to allow numerous selling members to place advertisements for goods and/or services, and to allow buying members to access the advertisements using a web browser to shop for and purchase goods and services from selling members.

The disclosed invention improves the system of sellers connecting with potential buyers using online classified advertising. The service provided enables selling members to advertise to unknown parties with a higher level of confidence that a given unknown party is who they allege to be. Nonmembers visiting the site will still be able to view the items available for sale on the selling member webpages. However, contact information may be withheld until the nonmember is adequately verified.

Figure 1:
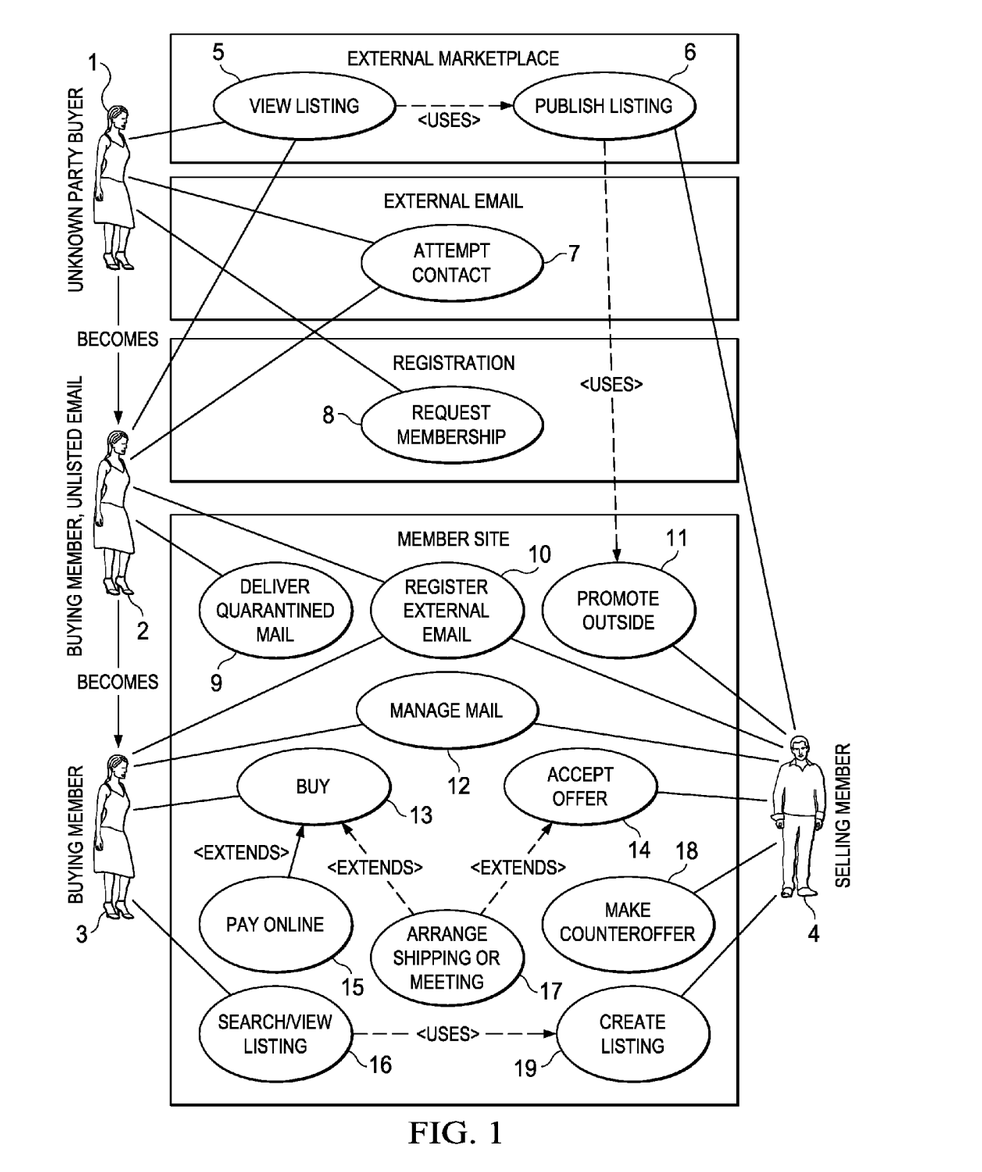
FIG. 1 is a generalized use case diagram illustrating the roles and activities of users within the embodiment.

FIG. 1 illustrates use cases according to certain embodiments of the present invention as disclosed and described herein. In a first embodiment an online marketplace is provided as a website accessible by a URL over a computer network. The selling member (4) creates a listing (19) on the marketplace website. One or more buying members (3) is able to search or view advertisement listings on the website (16), and then make offers to buy (13). The selling member (4) may then make either a counteroffer (18), or an offer of acceptance (14). The buying member (3) may then pay online (15) for the purchase and arrange for shipping or a meeting (17) with the selling member (4) to take possession of the goods or to receive the services.

In order for an unknown party (1) to participate in a purchase transaction, the unknown party (1) must become a buying member (2) by requesting membership (8), and then may become a buying member with registered email address (3) by registering their external email address (10).

In the present embodiment, in order to join the online marketplace, each member (buyer and seller) must establish and prove his or her identity by providing the secure membership server with identifying information that is sufficient to verify that the identity given is valid and that the prospective member can reasonably be shown to be the person identified. Also, the member must provide verifiable physical address information. This information includes, but is not limited to, evidence of dwelling ownership or rental, official governmental ID information, or other information that may be crosschecked on reputable state or federal databases accessible directly or through third party services. Further validation is conducted to ensure the prospective member is currently physically located nearby his or her stated physical address. Indicators of physical location may include GPS information from cellular phones or portable computers and Internet IP address of the member's connecting computer. For example, the secure membership service may provide a software application that accesses the member's computing device GPS, or may send a text or email to the member's computing device that requires a response that includes the GPS location information. The member's approximate location can also be obtained by looking up the member's public IP address in a geolocation database (for example, freegeoip, MaxMind, etc.). Based on the subnet within which the IP address is located, and the route taken to reach that IP address, such a geolocation database is able to physically locate a member within a reasonable margin of error. The information collected is then held in confidence by the service, and not provided to other members without consent, but the service is able to represent that the member has been verified.

Figure 2:
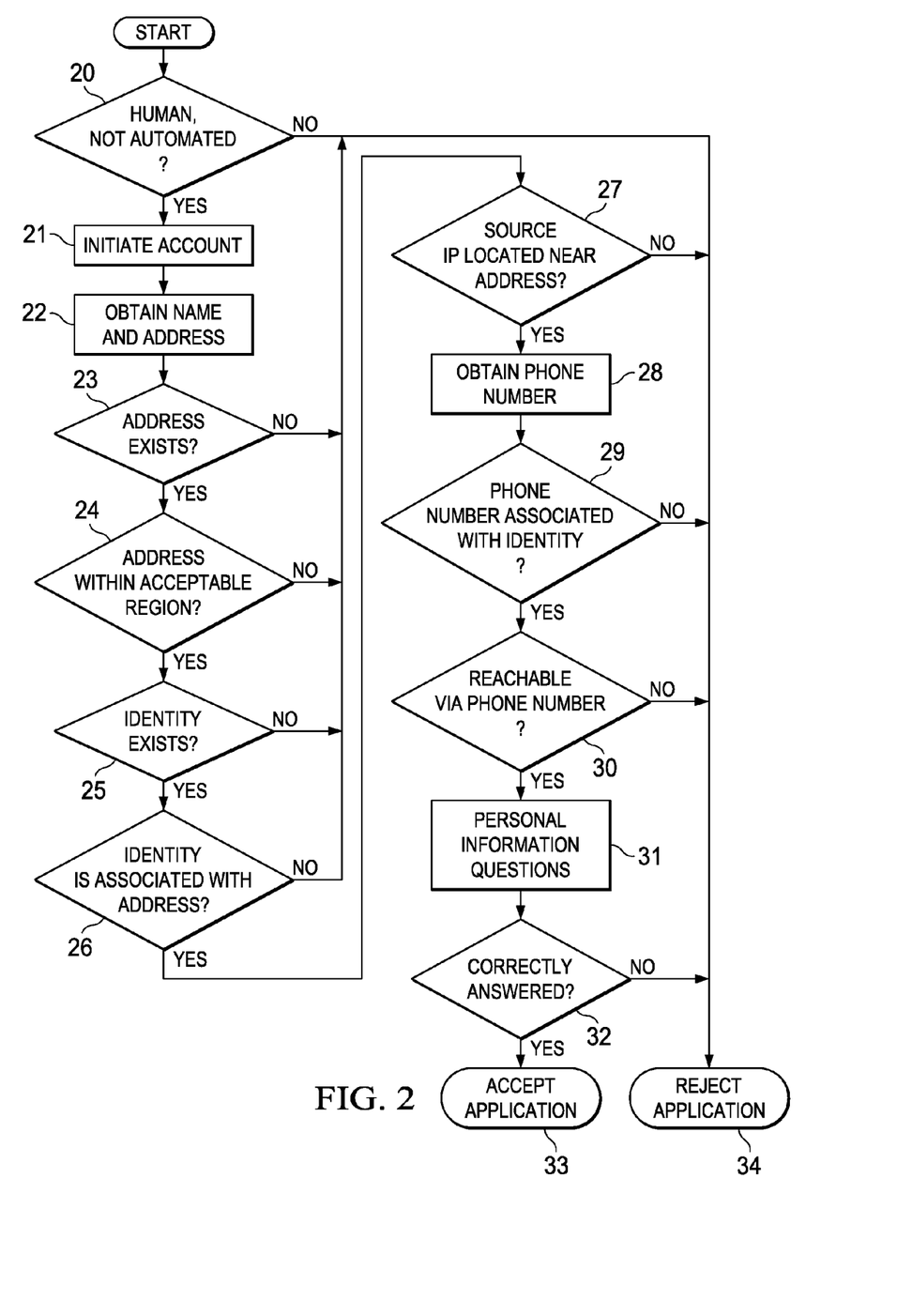
FIG. 2 is a flow diagram illustrating a methodology for authenticating and verifying the identity of prospective member users in an embodiment.

FIG. 2 is a flow diagram illustrating a methodology for authenticating the identity of a prospective member (1) in an embodiment. A determination is first made whether the prospective member (1) is human or an automated process (20) by using a challenge-response test (for example, the CAPTCHA utility located online at". http://en.wikipedia.org/wiki/CAPTCHA) or other such human/machine verification mechanism. Any attempt determined to be from an automated system would be rejected (34) while a human would proceed to initiate a new account (21). After a suitable username and password is created, the system would obtain a name and physical location address information (22) from the prospective member (1).

For the alleged physical location address, a determination is made whether the address truly exists (23). This determination may be made using state property databases, or other reputable online mapping services including Google Maps or Bing Maps. If the physical address is determined not to exist, the application is rejected (34). Otherwise a determination is made whether the address falls within a region targeted by the marketplace (24). An address outside the marketplace region would be deemed unacceptable and would cause the prospective member (1) to be rejected (34). If the address is acceptable, a determination is made whether the given identity exists (25). Again, this determination may be made by utilizing the data available on state and/or federal databases (property, birth record, marriage record, etc.). An unverifiable identity would cause the application to be rejected (34). Next, a determination is made that the identity given can be reasonably determined to match the address that was given (26). If unable to match the address with the identity, the application is rejected (34). For a verifiable address, a determination is made whether the source IP address or the GPS location of the membership request is within a reasonable distance of the given address (27). A source IP address or GPS location determined to be too far from the given address would result in a rejected application (34).

In another embodiment the prospective member is challenged by being asked to answer questions generated based on publicly available data for the alleged identity (31). Publicly available data may be readily obtained by the secure membership server from private, state, and federal online databases. The secure membership server accesses these data sources to obtain sufficient data to formulate questions such that the person identified could be reasonably expected to answer correctly, and provides these questions to the prospective member. For example, a state public data database might be accessed to determine if the person identified was married and on what date the marriage occurred. If the prospective member is the person identified, there is a very high statistical likelihood that he or she would be able to provide the correct wedding date if asked. If the questions are not answered correctly (32), the application is rejected (34). However, if each of these validity checks has been satisfactorily passed, the new member application is accepted (33).

In another embodiment, with the prospective member's (1) identity and address authenticated, the system obtains the prospective member's phone number. A determination is then made as to whether the provided phone number matches the alleged member identity (29). If a matching phone number is not provided it will result in the application being rejected (34). In another embodiment a determination may be made whether the prospective member (1) is reachable at the given phone number (30) by completing an automated call. If the prospective member is not reachable then the application is rejected (34).

Figure 3:
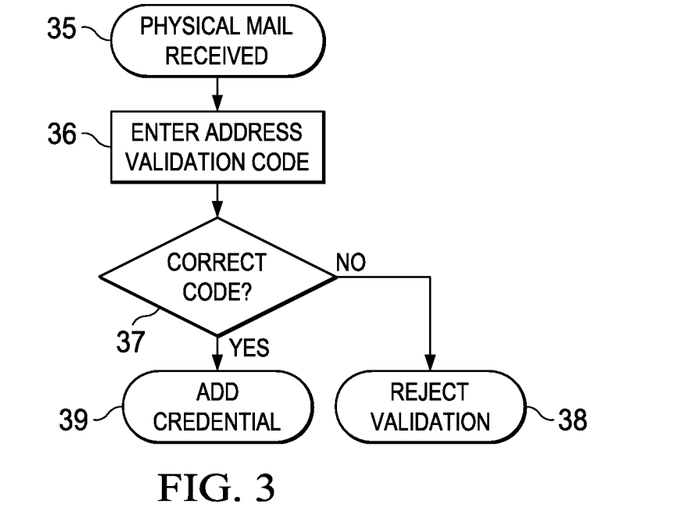
FIG. 3 is a flow diagram illustrating a methodology for validating the physical address of a member in an embodiment.

FIG. 3 is a flow diagram illustrating a methodology for validating the physical address of a member in another embodiment. When the new prospective member receives the physical mail (35), the member must return to the registration website and enter the validation code that was included in the physical mail (36). If the code is incorrectly entered (37), the member account validation is rejected (38). Otherwise a credential would be added to the member account (39) indicating that the member's address had been validated, thereby providing an elevated level of confidence that the member is as alleged. In another embodiment the address is validated by mailing a postcard or other notification to the alleged physical address, with instructions that the mailing be returned with the prospective member's signature. The mailing may include a randomly generated code or other security features (for example, security paper similar to that used with currency) in order to ensure authenticity. In yet another embodiment the prospective member receives an email document with instructions to print, sign, and return the email document by regular postal mail to verify both the email address and the physical location address.

In yet other embodiments prospective members may be able to complete further validations steps in order to achieve additional credentials and an even higher level of confidence regarding the member's authenticity and validity of information provided. The secure membership manager may then assign a confidence ranking to each member, with the confidence ranking disclosed to selling members. In yet other embodiments members may be able to endorse or be endorsed by selling members or other buying members. These endorsements provide an additional authentication factor and would be added to the member's credentials.

Another embodiment allows selling members to specify a limited region in which they are willing to advertise. In this case, the item may be shown to potential viewers or not based on the unknown member's or unauthenticated buying member's physical location information. Restricting the advertising region reduces the chance that a party intent on committing a fraudulent act will contact the selling member, especially a party from known foreign countries in which such a scam is common.

Figure 4:
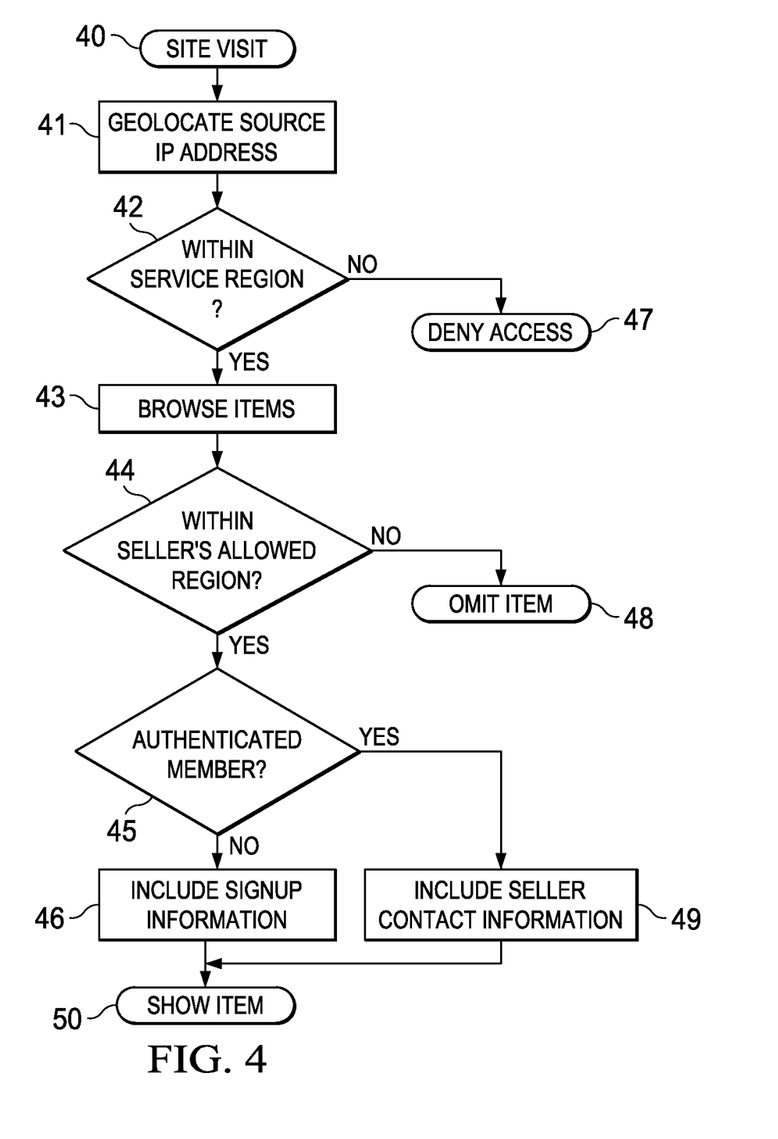
FIG. 4 is a flow diagram illustrating a method for controlling and limiting the publication of website and member user information in an embodiment.

FIG. 4 is a flow diagram illustrating a method for controlling and limiting the publication of website and member user information in an embodiment. As shown, an unknown party is allowed to browse items being sold by Selling Members (4). When an unknown party (1), or simply the unauthenticated buying member user, visits the website (40), the approximate geographical location of the unknown party's web browser source IP address is determined by performing a geolocation database lookup (41). A determination is then made as to whether the address (and, consequently, the web browser) is located within the acceptable predetermined geographic service region (42). This region may be established by the selling member (4) or may be provided as a default by the secure membership server.

A request coming from an unacceptable geographic location would be denied access to the information (47) and may be logged for subsequent analytical purposes. If, however, the unknown party (1) is within an allowed geographic service region, they are allowed to at least browse the items that are for sale (43). A determination will be made whether the unknown party (1) is within the selling member's (4) allowed geographic service region (44). The allowed geographic service region (44) may be defined by the selling member or automatically using statistical data regarding prospective purchasers of the selling member's advertised goods or services. For example, if the seller is advertising an automobile designed for use within the United States, it is not likely that an inquiry originating from the Republic of Vanuatu would be valid. If the unknown party (1) is not within the allowed geographic region (in the aforementioned example, is not within the United States), the selling member's (4) item is omitted from the items visible to the unknown party (1). If, however, the item is to be shown to the unknown party (1), a determination (45) is made whether the party has previously authenticated themselves as a buying member (2). For an authenticated buying member (2), the selling member's (4) contact information is provided in the item listing (49). For an unknown party (1), information instructing the unknown party (1) how to sign up and achieve verification is provided (48). In either case, the item is included and shown (50).

In another embodiments the secure membership server allows selling member advertisements to be republished on other sites (11). In this case, the secure membership server provides to the selling member for use in the republished ad a unique, temporary email address. In this embodiment the email address may uniquely correspond to the item being advertised, and also may be valid only for a finite duration, typically the duration of the item listing on the service. Communication using the given email address passes through the service. Unknown parties (1) receive an automated response requiring them to sign up with the secure membership server for authentication before the communication is allowed through to the seller. Buying members (2) are requested to register their external personal email addresses (10) so that email communications from a buying member (4) can occur without an automated response.

Figure 5:
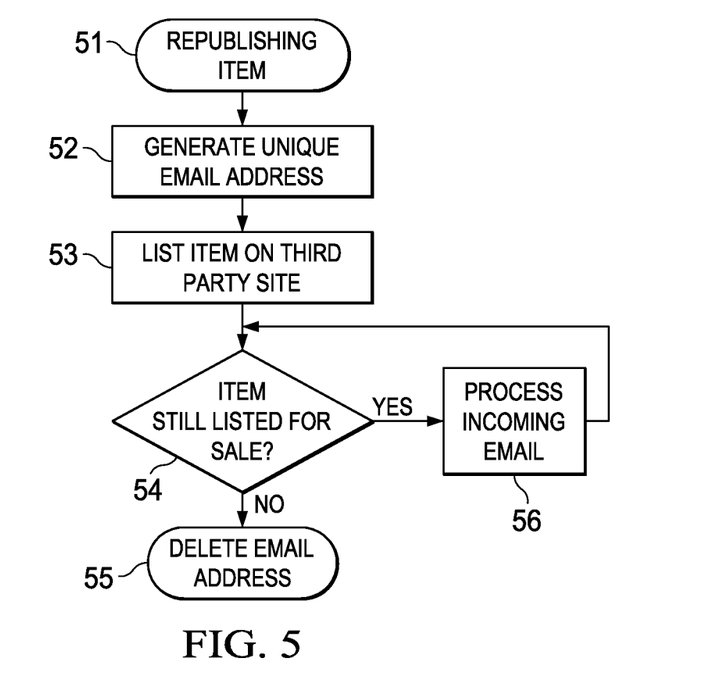
FIG. 5 is a flow diagram illustrating a method for enabling safely republishing member classified ads on other websites in an embodiment.

FIG. 5 is a flow diagram illustrating a method for enabling safely republishing member classified ads on other sites in an embodiment. This figure illustrates a method that allows a selling member (4) to republish an item to an external website. When the selling member (4) requests to republish an item (51), the secure membership server generates a unique email address (52) corresponding to the specific item. The selling member then republishes the item on the external website (53), using the generated email address as protected contact information. Thus, while the item is listed for sale (54), all incoming email correspondence with the generated address is processed (56). Once the item is no longer listed and the listing has been deleted, the address is deleted (55) and subsequent email communications are no longer processed. By providing this email address the secure membership server is able to act on the seller's behalf requiring that the buyer's credentials be validated before the seller is contacted. By using a unique email address (52), the secure membership server is able to track advertisement metrics for activity on the external website upon which the advertisement was republished, and to credit this activity to the primary hosting website. For example, the number of clicks on or page views of the advertisement on the external website may be easily credited to the original advertisement on the primary hosting website.

Figure 6:
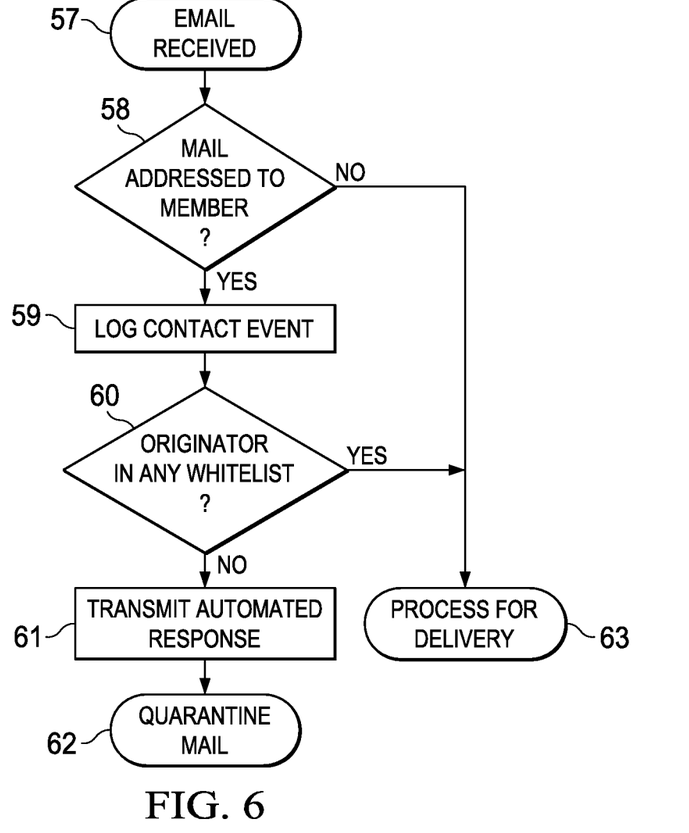
FIG. 6 is a flow diagram illustrating a methodology and structural flow for processing incoming email that may or may not be from a buyer to a seller in an embodiment.

FIG. 6 is a flow diagram illustrating a methodology and structural flow for processing incoming email that may or may not be from an authenticated buying member to a selling member. When an email is received (57), a determination is first made as to whether the email is addressed to an authenticated member (58). If the email is not addressed to a member, the email is processed for delivery (63) in the usual way for system accounts. If the email is addressed to a member, a log record is made of the event (59). Next a determination is made (60) as to whether the originator of the email is in any whitelist indicating they are a known member. If the originator is known the mail is processed for delivery (63). If the user is unknown an automated response is transmitted back to the sender (61) and the mail is subsequently quarantined (62) and withheld from delivery. The automated response is intended to inform the prospective member (1) how he or she can request membership (8) and register their external email (10) so that the quarantined email may be delivered (9).

Figure 7:
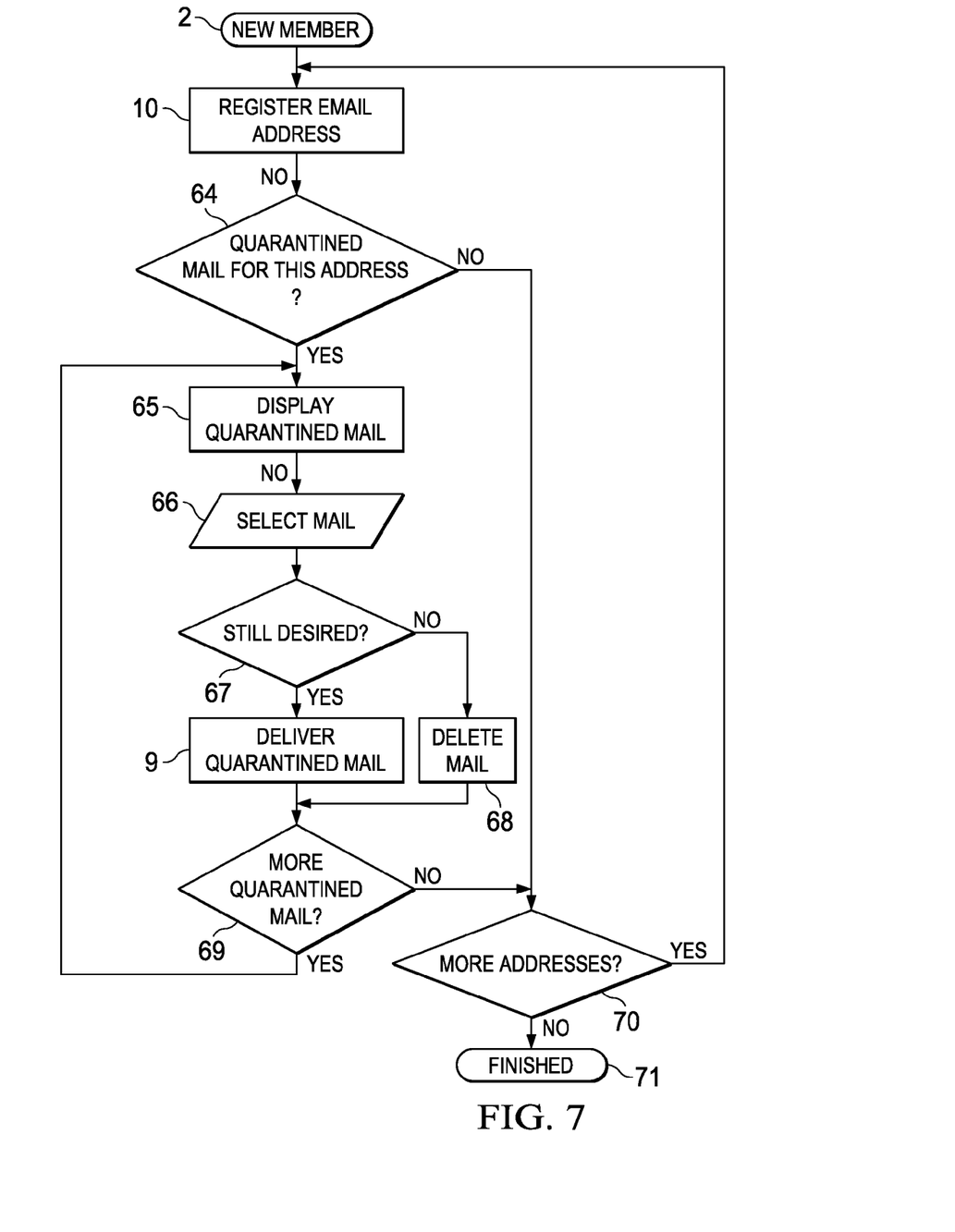
FIG. 7 is a flow diagram illustrating a method for a new member to release prior quarantined emails so they are delivered to their original intended destination in an embodiment.

FIG. 7 is a flow diagram illustrating a method for a new member to release prior quarantined emails so they are delivered to their original intended destination in an embodiment. The new member (2) registers his or her external email address with the secure membership server (10), which authenticates the email address as mentioned previously. Once the email address is registered (10), a determination is made as to whether there is quarantined email that has been stored for the given address (64). If email correspondence has been quarantined, the correspondence is displayed (65) to the new member. The member may then select individual email items (66), if still desired (67), for delivery to the intended recipient (9), or may delete the email (68). This process may be repeated for any additional email that is still quarantined (69). Otherwise, or if there is no further quarantined mail for the newly registered email address, the member may register additional email addresses (70).

In another embodiment the secure membership server provides a means to facilitate the completion of a sale online or offline. In this embodiment buyers may make an online payment, and sellers receive the payment securely and may then arrange for physical shipment of the item. Alternatively, the buyer member and seller member are presented by the secure membership server service with options to arrange a meeting location for completion of the transaction. Possible locations within an acceptable geographic radius from each party are presented as options from which to choose. The secure membership server automatically determines these locations without releasing the exact location information of either party to the other.

Figure 8:
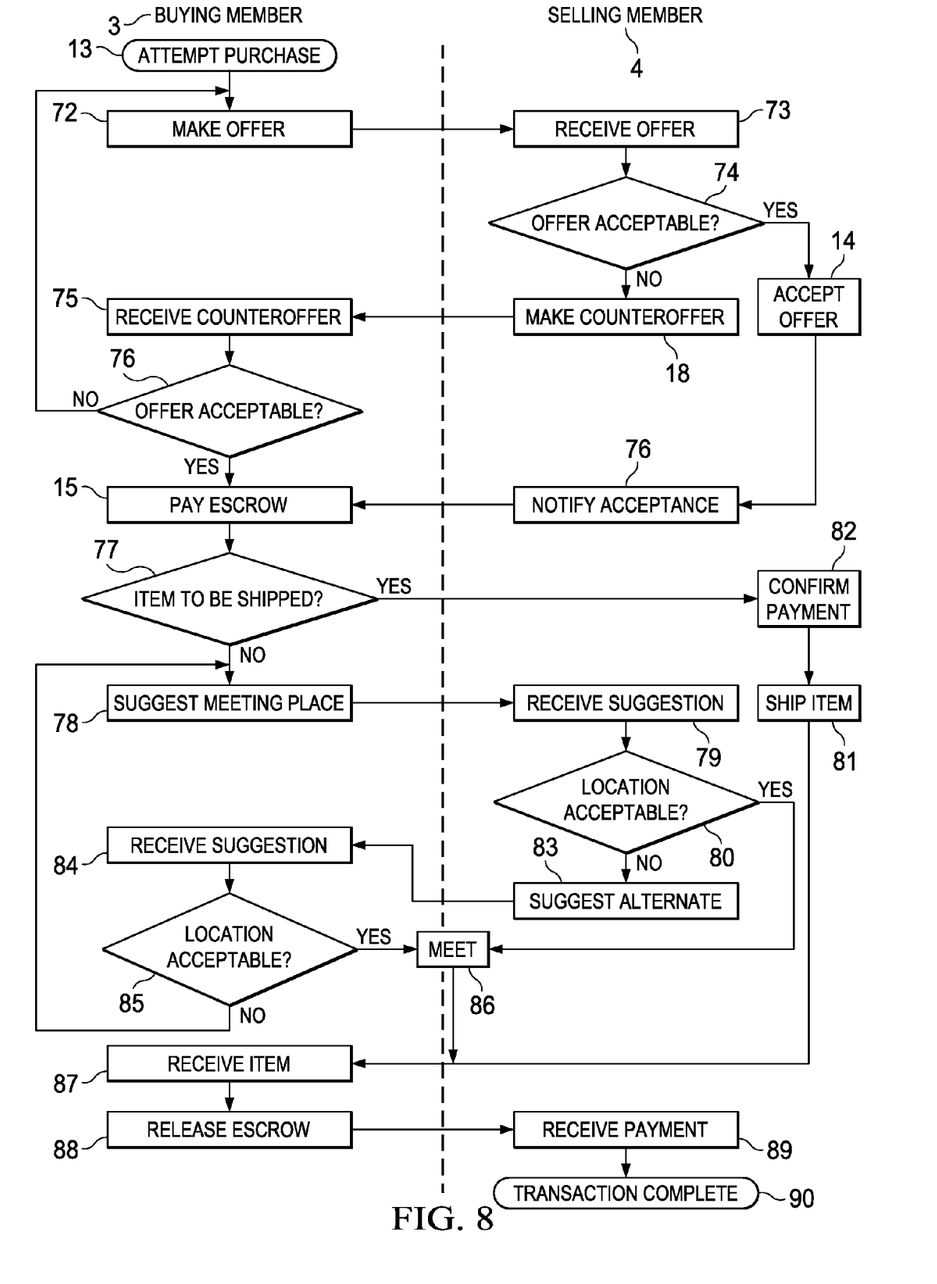
FIG. 8 is a flow diagram illustrating a method for agreeing to a purchase price and completing a transaction online, potentially using escrow of funds and either online shipment or arrangement of a mutually agreeable meeting location in an embodiment.

In another embodiment the secure membership server provides the ability to escrow funds until both parties agree the transaction has been completed. FIG. 8 illustrates a generalized method for facilitating the completion of a transaction. When a buying member (3) attempts a purchase (13), the buying member (3) may make an initial offer (72) to the selling member (4), who after receiving the offer (73) makes a determination as to whether the offer is acceptable (74). If the offer is not acceptable, the selling member (4)

may make a counteroffer (18) to the buying member (3). When the buying member (3) receives the counteroffer (75), the buying member must, in turn, make a determination as to whether the counteroffer is acceptable (75). If the counteroffer is not acceptable, the buying member (3) may elect to make a new offer (72), thus repeating the process of offer/counteroffer unless aborted. If the selling member (4) determines that a received offer or counteroffer is acceptable, the selling member (4) may accept the offer (14) and notify the buyer of their agreement (76). When the Buying Member (3) receives notice of an accepted offer or receives an acceptable counteroffer, the buying member (3) may elect to make a payment into escrow for the item (15), thus locking the price.

If the item is to be shipped to the buyer (77), the selling member (4) confirms that payment has been received by the escrow (82) prior to shipping the item (81). If the item is not to be shipped, the buying member (3) may propose a meeting place (78). Such meeting place may be chosen from a set of possibilities determined to be relatively equidistant from the geographical location of each party. These options may be presented to each party without revealing the physical location or other personally identifiable information of either party to the other. When the selling member (79) receives the suggested location, he or she makes a determination (80) as to whether the location is acceptable. If the location is not acceptable, the selling member (4) may make an alternate suggestion (83). When the buying member (3) receives the alternate suggestion (85), the process is repeated until an acceptable location is agreed upon. If an agreement is reached on an acceptable location, the buying member (3) and the selling member (4) meet at the agreed location 86 to exchange the item. When the buying member (3) receives the item (87) either by meeting in person (86) or by receiving a shipped item (81), the buying member (3) releases the funds held in escrow (88) thereby enabling the selling member to receive payment (89) and complete the transaction (90).

In another embodiment the secure membership server service provides members the ability to advertise services through an arbiter. The arbitrating member may act as an unbiased or uninterested, or even an expert 3rd party in a transaction, who would receive goods that have been sold and approve or disapprove of the received goods before delivering them to the buyer. The arbitration and verification could happen either after a good is sold, or could happen in advance of sale of the good, with the arbiter even warehousing the item until it is ultimately sold and shipped.

Figure 9:
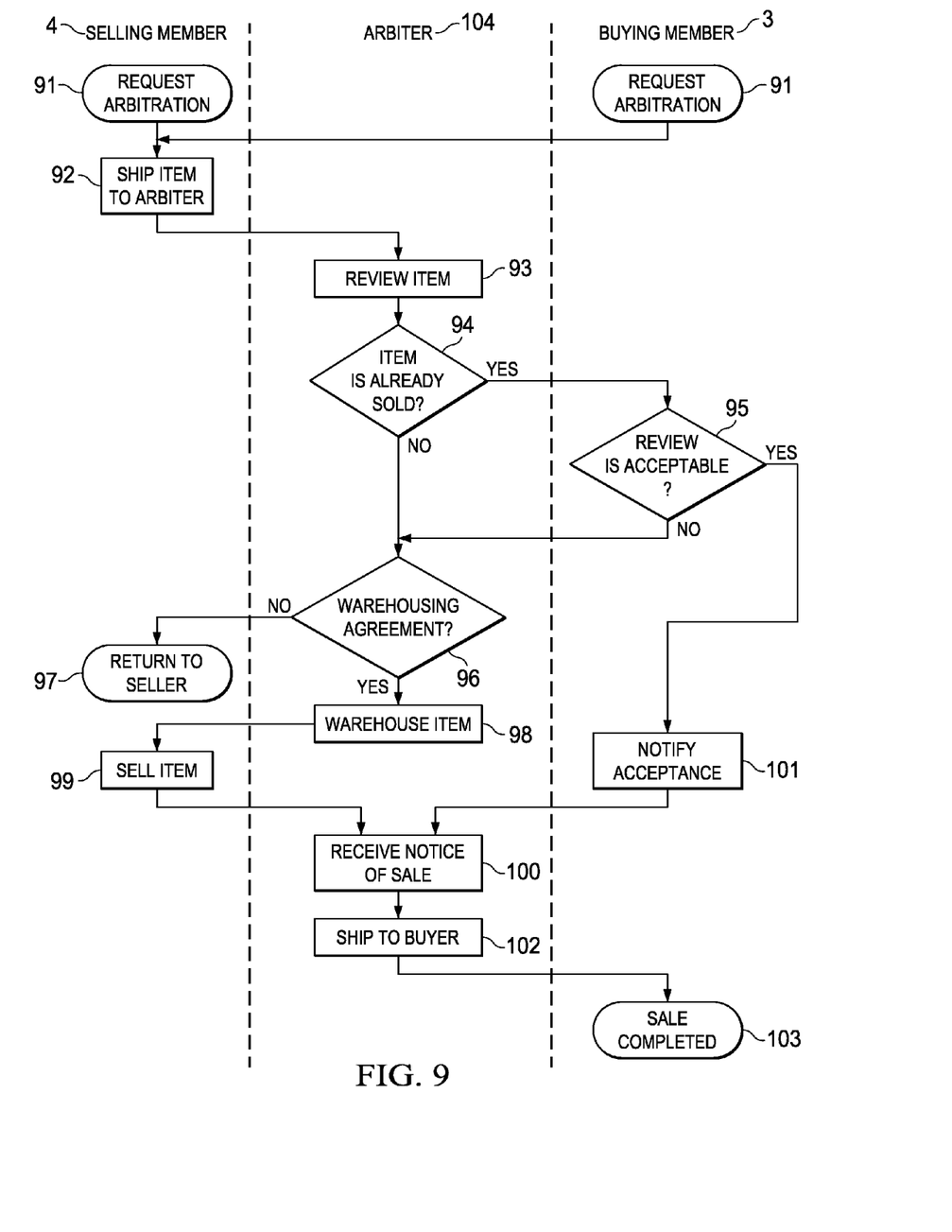
FIG. 9 is a flow diagram illustrating the interaction between a buyer, seller, and arbiter, where the arbiter may temporarily warehouse an item for sale in an embodiment.

FIG. 9 illustrates a generalized method by which an arbiter (104) facilitates a transaction between a buying member (3) and a selling member (4). Either the selling member (4) or the buying member (3) may request arbitration (91). When arbitration has been requested, the selling member (4) ships the item to the arbiter (92). After receiving the item, the arbiter (104) conducts any necessary inspection of the item (93). If the item has already been sold to a buying member (94), the arbiter allows the buying member to conduct a review of the item to determine its acceptability (95). If the buying member determines that item is not acceptable or if the item has not yet been sold, the arbiter (104) determines whether a warehousing agreement exists (96) between the selling member (3) and the arbiter (104). If no warehousing agreement exists, the arbiter returns the item to the seller (97), ending the transaction. If a warehousing agreement exists, the arbiter warehouses the item (98), storing it until such time as it is sold. When the selling member (4) sells the item (99), the arbiter is notified of the sale (100) or if a buying member (3) notifies the arbiter that the item is acceptable based upon the arbiter's review of the item, the arbiter receives notice that the item is sold (100). When notice that the item is sold is received (100), the arbiter ships the item directly to the buying member (102), thus completing the transaction (103).

The functionality described herein may be realized through software programming instructions executing on one or more automated computing devices in communication over a computer network. The stored program instructions may be provided in any appropriate high or low level programming language, including PHP, Java, JavaScript, Objective C, SQL, Ruby, C, C++, C#, .NET, Python, or the like, or any combination thereof. One of ordinary skill in the art to which the invention pertains is aware of and understands these programming languages and how to implement the described functionality using the appropriate programming language for the chosen hardware platform upon which it is intended to operate.

Figure 10:
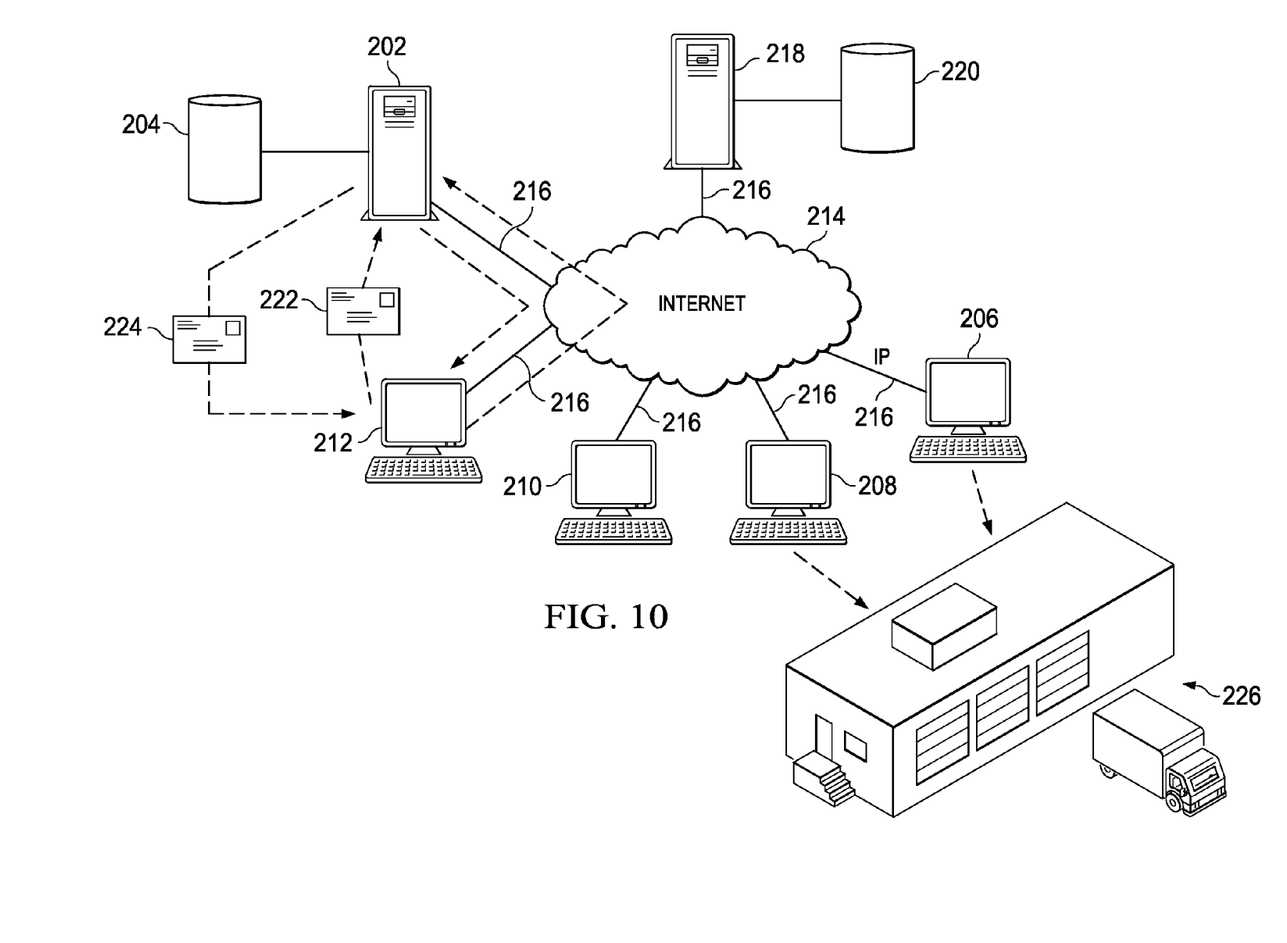
FIG. 10 is a depiction of the arrangement and connectivity of the various hardware and user devices of a first embodiment of the invention.

With regard to the secure membership server, the present embodiment comprises a platform including one or more automated computing devices with one or more network-attached relational database devices. FIG. 10 is a depiction of the arrangement and connectivity of the various hardware and user devices of this embodiment of the invention. As shown, a typical online classified advertisement website server (218) is in network communication (216) with one or more member computers (206, 208, 210, and 212). This network (214) may be any computer network. Each member computer (206, 208, 210, and 212) may be utilized by a buying and/or selling member by accessing the advertisement website server (218) using an appropriate web browser.

The secure member server (202) is also network attached (216), and features a relational database device (204) upon which member information persists as discussed. Although a single secure member server (202) is depicted, the system may include a plurality of secure member servers for load balancing and redundancy. Further, the classified advertisement website server may also host a secure member server if the hardware capabilities are adequate (i.e., sufficient processor speed, memory, bandwidth, etc.).

Visual depiction is also provided regarding physical authentication methods described above. For example, an unverified buying member (2) utilizing his or her computing device (212) to access the secure membership server (202) may receive a physical mailing (224) at the address the unverified member initially provides. Once the mailing is signed and returned by the member (222), the member may receive verified status as a buying member (3). The secure membership server may also send the unverified member (2) an email message with a link to a form letter that must be signed by the member and mailed back to the administrator (222) before verification is completed.

Also depicted is the arbiter and/or warehousing element (226). As shown, a selling member (206) and a buying member (208) are transacting a potential sale of an item (good). The selling member (206) might surrender the good to an arbiter (226) for consideration and/or storage, and to allow the buying member (208) to consider the good and tender payment without direct contact with the selling member (206).

The invention may be embodied in other specific forms without departing from the spirit or essential characteristics thereof. For example, although the description herein of the online marketplace particularly mentions a classified advertisement website service, the novel teachings are equally applicable to the online sale of other goods and services including dating services, car-sharing services, and the like. The present embodiments are therefore to be considered in all respects as illustrative and not restrictive. Accordingly, the scope of the invention is established by the appended claims rather than by the foregoing description. While various alterations and permutations of the invention are possible, the invention is to be limited only by the following claims and equivalents. Further, the recitation of method steps does not denote a particular sequence for execution of the steps. Such method steps may therefore be performed in a sequence other than that recited unless the particular claim expressly states otherwise.

As indicated above, aspects of this invention pertain to specific "method functions" implementable through various computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writeable storage media (e.g. read only memory devices within a computer such as ROMs or CD-ROM disks readable only by a computer I/O attachment); (b) information alterably stored on writeable storage media (e.g. floppy disks and hard drives); or (c) information conveyed to a computer through communication media, such as a local area network, a telephone network, or a public network like the Internet. It should be understood, therefore, that such media, when carrying computer readable instructions that direct the method functions of the present invention, represent alternate embodiments of the present invention.

I claim:

1. A method for providing secure access by selling member users and buying member users to an online marketplace e-commerce service, the method steps comprising:
    accepting, on an online secure member server computing device comprising a membership authentication module adapted to automatically process a membership request, a request for membership to an online marketplace e-commerce service computing device from an unauthenticated buying member user, the membership request including a plurality of buying member user personal identity data; and
    restricting, with the membership authentication module, the unauthenticated buying member user's access to a selling member user's personal identity data with regard to an advertised offering placed by the selling member on the online marketplace e-commerce service, the restriction conditioned upon the outcome of at least one test for authentication of the buying member user.

2. The method of claim 1, wherein the plurality of buying member personal identity data include a name and a physical address, the at least one test for authentication further comprising:
    verifying that the physical address exists; and
    verifying that the name is associated with the physical address.

3. The method of claim 2, wherein the plurality of buying member personal identity data include an IP address of the buying member's computing device and wherein the selling member's advertised offering includes a physical address, the method steps further comprising:
    verifying, using the IP address of the buying member's computing device, that the geographic location of the buying member user is within a defined geographic service region associated with the advertised offering physical address.

4. The method of claim 1, wherein the plurality of buying member personal identity data include an email address, the at least one test for authentication further comprising:
    initiating contact with the buying member user using the buying member provided email address; and
    authenticating the buying member user following receipt of a valid email response to the initial contact email.

5. The method of claim 1, wherein the plurality of buying member personal identity data include a phone number, the at least one test for authentication further comprising:
    initiating contact with the buying member user using the buying member provided phone number; and
    authenticating the buying member user based upon the results of the phone contact.

6. The method of claim 1, wherein the plurality of buying member personal identity data include a name and a physical address, the at least one test for authentication further comprising:
    sending a postal mailing to the physical address, wherein the postal mailing includes a first validation code; and
    authenticating the buying member user based upon the buying member user's entry of the first validation code on the secure member server.

7. The method of claim 1, the method steps further comprising:
    restricting an unauthenticated buying member user's access to the advertised offering data if the unauthenticated buying member user's approximate geographic location is not within an allowed geographic service region.

8. The method of claim 1, the method steps further comprising:
    receiving an email in response to the advertised offering; and
    if the sender of the email is not on an approved whitelist of authenticated buying members, quarantining the email until the sender becomes an authenticated buying member.

9. The method of claim 1, the method steps further comprising:
    assigning a confidence ranking to the authenticated buying member based on endorsements of the authenticated buying member by other buying members or selling members.

10. The method of claim 1, the method steps further comprising:
    generating a unique email address for the advertised offering;
    tracking an external website activity metric with respect to a republished version of the advertised offering on an external website; and
    crediting the tracked external website activity metric to the original advertised offering.

11. The method of claim 1, the method steps further comprising:
    recommending a geographical location for the unauthenticated buying member user to meet with the selling member user based on the geographic locations of the unauthenticated buying member user and the selling member user.

12. The method of claim 1, wherein the plurality of buying member personal identity data include a name, the at least one test for authentication comprising:

formulating at least one personal question regarding the name based on information obtained from online data sources, wherein only the individual associated with the provided name would reasonably be expected to provide a successful answer;

soliciting the answer from the contacted buying member to the at least one personal question; and authenticating the buying member user based upon the answer provided.

13. A system for providing secure access by selling member users and buying member users to an online marketplace e-commerce service, the system comprising:

an online secure membership server computing device in network communication with an online marketplace e-commerce service computing device, the secure membership server comprising a membership authentication module adapted to accept a request for membership to the online marketplace e-commerce service from an unauthenticated buying member user, the membership request including a plurality of buying member user personal identity data, the membership authentication module further adapted to restrict the unauthenticated buying member user's access to a selling member user's personal identity data with regard to an advertised offering placed by the selling member on the online marketplace e-commerce service, the restriction conditioned upon the outcome of at least one test for authentication of the buying member user.

14. The system of claim 13, wherein the plurality of buying member personal identity data include a name and a physical address, wherein the online secure membership server further comprises an address authentication module adapted to verify that the physical address exists, and to verify that the name is associated with the physical address.

15. The system of claim 14, wherein the plurality of buying member personal identity data include the IP address of the buying member's computing device and wherein the selling member's advertised offering includes a physical address, wherein the address authentication module is further adapted to verify, using the IP address of the buying member's computing device, that the geographic location of the buying member user is within a defined geographic service region associated with the advertised offering physical address.

16. The system of claim 13, wherein the plurality of buying member personal identity data include an email address, the at least one test for authentication further comprising:

initiating contact with the buying member user using the buying member provided email address; and authenticating the buying member user following receipt of a valid email response to the initial contact email.

17. The system of claim 13, wherein the plurality of buying member personal identity data include a phone number, the at least one test for authentication further comprising:

initiating contact with the buying member user using the buying member provided phone number; and authenticating the buying member user based upon the results of the phone contact.

18. The system of claim 13, wherein the plurality of buying member personal identity data include a name and a physical address, the at least one test for authentication further comprising:

sending a postal mailing to the physical address, wherein the postal mailing includes a first validation code; and authenticating the buying member user based upon the buying member user's entry of the first validation code on the secure member server.

19. The system of claim 13, wherein the membership authentication module is further adapted to restrict an unauthenticated buying member user's access to the advertised offering data if the unauthenticated buying member user's approximate geographic location is not within an allowed geographic service region.

20. The system of claim 13, wherein the membership authentication module is further adapted to receive an email in response to the advertised offering, and if the sender of the email is not on an approved whitelist of authenticated buying members, to quarantine the email until the sender becomes an authenticated buying member.

21. The system of claim 13, wherein the membership authentication module is further adapted to assign a confidence ranking to the authenticated buying member based on endorsements of the authenticated buying member by other buying members or selling members.

22. The system of claim 13, wherein the membership authentication module is further adapted to generate a unique email address for the advertised offering; track an external website activity metric with respect to a republished version of the advertised offering on an external website; and credit the tracked external website activity metric to the original advertised offering.

23. The system of claim 13, wherein the membership authentication module is further adapted to recommend a geographical location for the unauthenticated buying member user to meet with the selling member user based on the geographic locations of the unauthenticated buying member user and the selling member user.

24. The system of claim 13, wherein the plurality of buying member personal identity data include a name, the at least one test for authentication further comprising:

formulating at least one personal question regarding the name based on information obtained from online data sources, wherein only the individual associated with the provided name would reasonably be expected to provide a successful answer;

soliciting the answer from the contacted buying member to the at least one personal question; and authenticating the buying member user based upon the answer provided.

\* \* \* \* \*